(No Model.)

W. LANGMUIR.
RUBBER TIRE.

No. 511,850. Patented Jan. 2, 1894.

Witnesses
W. J. McMillan
J. Edw. Maybee

Inventor
Woodburn Langmuir
by Donald C. Ridout & Co.
Attys.

THE NATIONAL LITHOGRAPHING COMPANY,
WASHINGTON, D. C.

UNITED STATES PATENT OFFICE.

WOODBURN LANGMUIR, OF TORONTO, CANADA.

RUBBER TIRE.

SPECIFICATION forming part of Letters Patent No. 511,850, dated January 2, 1894.

Application filed February 3, 1893. Serial No. 460,888. (No model.)

*To all whom it may concern:*

Be it known that I, WOODBURN LANGMUIR, of the city of Toronto, in the county of York and Province of Ontario, Canada, have invented a certain new and useful Improvement in Rubber Tires, of which the following is a specification.

The object of the invention is to make and hold a rubber tire in such a manner that it will remain rigidly in position and should any increase of holding strain be required, will permit the increase without detracting from the life or elasticity of the tire, and it consists of a rubber tire having a concave or space made in its base which base is fitted between flanges formed one on each side of a metal band secured to the felly, a metal rod or other means being provided for the purpose of compressing the rubber tire and forcing its edges against the band and its flanges in such a manner that, while rigidly holding the rubber tire in position, will leave a space below the base of the tire, substantially as hereinafter more particularly explained.

Figure 1:
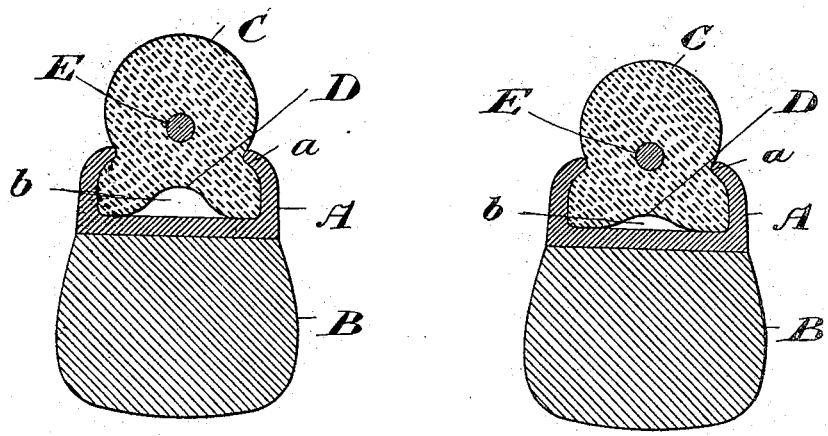
Figure 1:
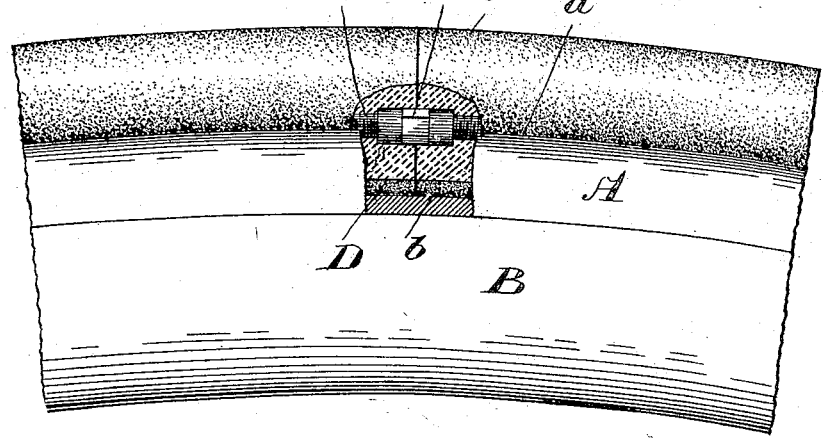

Figure 1, is a side view of a portion of a felly provided with my improved tire. Fig. 2, is a cross-section of the felly and tire after the tire has been compressed into position by the rod. Fig. 3, is a similar view of the tire after it has been further compressed by increased tension on the rod.

In the drawings—A, is a metal band secured to the felly by bolts or in any other suitable way.

*a*, is a flange formed on each side of the band A, making a space which extends entirely around the wheel forming a chamber into which the rubber tire C, is placed. The flanges *a*, are preferably curved inwardly as indicated.

In the center of the base of the tire C, a concave or space *b*, is formed and extends entirely around the tire. The walls forming the said concave or space are ogee-shaped and are widest at the extreme base, as shown in Fig. 2, so that any pressure of the tire against the metal band has a tendency to force the lower edges of the walls against the metal band (thereby making the concave or space narrower). The arch over the concave or space consequently becomes rigid and expands the tire forcing its edges against the flanges *a*, and causing the tire to become locked rigidly in position. The flanges thus prevent the tire from flattening out, and a concave or space always remains in the center of the tire so that there is an air cushion permanently below the tire keeping it in a live and springy condition.

Although I do not wish to confine myself to a rod constructed as shown, I may mention that I compress the rubber tire C, in position by means of a rod E, which extends through a hole in the tire C. The ends of this rod E, are connected together by a nut F, (see Fig. 1,) which has a right and left hand thread cut in it to receive the correspondingly threaded ends of the rod E, and thus enable the ends of the rod to be drawn together by revolving the nut. By thus drawing the rod, the tire C, is forced into place, as before described.

I may mention that the tire C, may be divided into a number of sections, and when shaped and held together as described, will be quite as serviceable as though made in a single piece, and it will often be found better that a portion of the tire may be removed and replaced without requiring the entire change of a tire.

What I claim as my invention is—

1. A rubber tire having a concave or space made in its base, which base is placed between flanges formed one on each side of a metal band secured to a felly, in combination with a metal rod or other means for the purpose of compressing the rubber tire and forcing its edges against the band and its flanges in such a manner that while rigidly holding the rubber tire in position, will leave a concave or space below the tire, substantially as and for the purpose specified.

2. A rubber tire having a concave or space made in its base, which base is placed between inwardly curved flanges formed one on each side of a metal band secured to a felly, in combination with a metal rod or other means for the purpose of compressing the rubber tire and forcing its edges against the band and its flanges in such a manner that while rigidly holding the rubber tire in position, will leave a concave or space below the tire, substantially as and for the purpose specified.

3. A rubber tire having a concave or space made in its base, the said concave or space having ogee-shaped walls and which base is placed between inwardly curved flanges formed one on each side of a metal band secured to a felly, in combination with a metal rod or other means for the purpose of compressing the rubber tire and forcing its edges against the band and its flanges, in such a manner that while rigidly holding the rubber tire in position, will leave a concave or other space below the tire, substantially as and for the purpose specified.

4. A rubber tire having a concave or space made in the center of its base, the said concave or space having ogee-shaped walls, and which base is placed between inwardly curved flanges formed one on each side of a metal band secured to a felly, in combination with a metal rod or other means for the purpose of compressing the rubber tire and forcing its edges against the band and its flanges in such a manner that while rigidly holding the rubber tire in position, will leave a concave or space below the center of the tire, substantially as and for the purpose specified.

Toronto, January 10, 1893.

WOODBURN LANGMUIR.

In presence of—
A. M. NEFF,
J. EDW. MAYBEE.